United States Patent
Bregman et al.

(10) Patent No.: US 11,301,246 B2
(45) Date of Patent: Apr. 12, 2022

(54) AUTOMATICALLY GENERATING CONTINUOUS INTEGRATION PIPELINES

(71) Applicant: Red Hat, Inc., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/996,069

(22) Filed: Aug. 18, 2020

(65) Prior Publication Data

US 2022/0058018 A1 Feb. 24, 2022

(51) Int. Cl.
*G06F 8/77* (2018.01)
*G06F 11/36* (2006.01)
*G06F 9/54* (2006.01)

(52) U.S. Cl.
CPC ............ *G06F 8/77* (2013.01); *G06F 9/542* (2013.01); *G06F 11/3676* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 9,454,351 B2 | 9/2016 | Anderson et al. | |
| 9,703,687 B2 | 7/2017 | Shani et al. | |
| 10,216,509 B2* | 2/2019 | Martin Vicente | ......... G06F 8/61 |
| 10,334,058 B2 | 6/2019 | Frank et al. | |
| 10,437,585 B2 | 10/2019 | Mills | |
| 10,656,927 B2 | 5/2020 | Hawrylo et al. | |
| 10,671,368 B2* | 6/2020 | Brealey | ............... G06F 11/3688 |
| 10,866,792 B1* | 12/2020 | Tomlin | ....................... G06F 8/70 |
| 2015/0026121 A1* | 1/2015 | Shani | ................ G06F 16/24578 707/609 |
| 2015/0277901 A1* | 10/2015 | Karle | ..................... G06Q 10/00 717/120 |
| 2017/0010889 A1* | 1/2017 | Spektor | ................... G06F 11/36 |

(Continued)

OTHER PUBLICATIONS

K. Martin, U. Ömer and M. Florian, "Towards a Continuous Feedback Loop for Service-Oriented Environments," 2018 11th International Conference on the Quality of Information and Communications Technology (QUATIC), 2018, pp. 126-134, doi: 10.1109/QUATIC.2018.00026. (Year: 2018).*

(Continued)

*Primary Examiner* — Andrew M. Lyons
(74) *Attorney, Agent, or Firm* — Kilpatrick Townsend & Stockton LLP (57) ABSTRACT

Continuous integration pipelines can be automatically generated. For example, a system of the present disclosure can receive an event notification indicating an event involving source code for a software project being submitted to a repository. The system can determine that the event does not have a corresponding continuous-integration pipeline. In response to (i) receiving the event notification and (ii) determining that the event does not have a corresponding continuous-integration pipeline, the system can generate a continuous integration pipeline based on information included in the event notification. The system can then apply the continuous integration pipeline to the source code. After applying the continuous integration pipeline to the source code, the system may delete the continuous integration pipeline.

20 Claims, 3 Drawing Sheets

(56) References Cited

U.S. PATENT DOCUMENTS

| | | | | |
|---|---|---|---|---|
| 2017/0177324 | A1* | 6/2017 | Frank | G06F 16/173 |
| 2018/0364985 | A1* | 12/2018 | Liu | G06F 11/3664 |
| 2019/0258976 | A1* | 8/2019 | Parees | G06Q 10/06313 |
| 2019/0303119 | A1* | 10/2019 | Atkinson | G06F 9/455 |
| 2021/0049128 | A1* | 2/2021 | Kernick | G06F 16/162 |

OTHER PUBLICATIONS

A. Steffens, H. Lichter and J. S. Döring, "Designing a Next-Generation Continuous Software Delivery System: Concepts and Architecture," 2018 IEEE/ACM 4th International Workshop on Rapid Continuous Software Engineering (RCoSE), 2018, pp. 1-7. (Year: 2018).*

"Triggering Pipelines in VMware Code Stream," VMware, Inc., 2019, https://docs.vmware.com/en/VMware-Code-Stream/services/Using-and-Managing-CodeStream/GUID-9C2B90D2-C913-4D82-902F-D03B3C9210DE.html.

Jayanthi, G., et al., "Build Pipeline Triggers Using Azure DevOps (CI)," DevOps Zone, Aug. 12, 2019, https://dzone.com/articles/build-pipeline-triggers-using-azure-devopscicd.

* cited by examiner

AUTOMATICALLY GENERATING CONTINUOUS INTEGRATION PIPELINES

TECHNICAL FIELD

The present disclosure relates generally to continuous integration during software development. More specifically, but not by way of limitation, this disclosure relates to automatically generating continuous integration pipelines.

BACKGROUND

Continuous integration is the process of merging developers' working copies of source code into a shared mainline code-base at frequent intervals, such as multiple times a day. Continuous integration is implemented using a software component called a continuous integration tool, such as Jenkins, Buildbot, and Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, a continuous integration pipeline includes multiple phases that are executed in a sequential order. For example, a continuous integration pipeline can first include a compilation phase in which the source code is compiled into artifacts. Artifacts are executable code that has been compiled from source code for testing. The continuous integration pipeline can next include a testing phase in which various types of tests (e.g., unit tests, integration tests, and acceptance tests) are executed on the artifacts. The testing phase can enable the developers to rapidly detect defects in the source code, so that they can be corrected as soon as possible. After the testing phase, the continuous integration pipeline can implement one or more other phases.

DETAILED DESCRIPTION

During a conventional software-development process, a development and operations (DevOps) engineer manually configures continuous integration tools to execute predefined continuous-integration pipelines (pipelines) in response to certain preselected events. In particular, the DevOps engineer first selects which events should trigger the execution of a pipeline. There may be numerous types of events that can occur during the software development process, and the DevOps engineer may select a limited subset of those events to trigger pipelines. Next, the DevOps engineer manually creates each of the pipelines corresponding to the selected events. That is, the DevOps engineer manually writes a specification for each pipeline, of which there may be dozens or hundreds depending on how many events are selected. The DevOps Engineer then finally assigns the pipelines to the selected events, so that the correct pipeline is executed in response to each event. These steps are complex, time consuming, and error prone. And if an event occurs for which there is no predesignated pipeline, then the continuous integration tool will simply not run a pipeline in response to the event. This may result in source code not being properly validated or tested, which may yield software defects and other problems. Furthermore, if a user happens to realize that a pipeline was not executed in response to the event, the user may then open a support ticket requesting that the DevOps Engineer manually create a pipeline for the event, which adds to the workload of the DevOps Engineer and the user.

Some examples of the present disclosure can overcome one or more of the abovementioned problems by automatically (e.g., with little or no human involvement) generating pipelines in response to events during a software development process. In one particular example, a system can receive an event notification (e.g., as a webhook) indicating that an event occurred during a software development process for a software project (project). The event may involve a change to source code of the project or another type of event. The system can also determine if a preexisting pipeline has been assigned to the event. For example, the system can access predefined mappings between events and preexisting pipelines, in order to determine if the mappings assign a preexisting pipeline to the event. If the system determines that a preexisting pipeline is assigned to the event, then the system can apply the preexisting pipeline to the source code. Otherwise, the system can automatically generate a pipeline, apply the pipeline to the source code, and then delete the pipeline. Such automatically generated pipelines can be relatively transitory in nature, in the sense that they may be deleted within a relatively short timespan after their creation. In this way, the system can automatically and dynamically generate pipelines on-the-fly in response to events that lack preexisting pipelines. This can reduce the burden on DevOps engineers in creating such pipelines, and minimize situations in which source code goes untested due to a lack of corresponding pipelines.

In some examples, the system may receive the event communication from a code review system, such as Gerrit, Collaborator, or Codebrag. A code review system allows multiple parties to collaborate in the development and review of source code, such as by allowing multiple parties to submit source code to a project repository, review the source code, comment on the source code, and authorize changes to the source code. Code review systems can also automatically monitor one or more aspects of a project, such as a project repository, to detect events associated with the project. In response to detecting such events, the code review systems can automatically transmit one or more event notifications indicative of the events to other components, such as the system described above.

In some examples, the user can interact with the system to customize one or more aspects of the automatically generated pipelines. For example, the user can specify one or more default software tests (tests) that are to be included in the automatically generated pipelines. As another example, the user can specify a format for output logs and reports from the automatically generated pipelines. As still another example, the user can specify a retention time for which the system is to retain an automatically generated pipeline after the pipeline has been applied to the target source code. This may allow the pipeline to be reused in relation to another event, which may reduce computational overhead as compared to re-generating the pipeline each time it is needed. Upon the expiration of the retention time, the system may automatically delete the pipeline. The system can receive such user customizations, for example prior to receiving the event notification, and configure the automatically generated pipelines based on the user customizations.

In some examples, a user can customize the system to automatically generate pipelines for certain projects, groups of projects, event types, or any combination of these. For example, the user may customize the system to automatically generate a pipeline for a particular type of event associated with a particular project. Based on this customization, the system can automatically generate a pipeline in response to detecting that the particular type of event occurred in relation to the particular project. Similarly, the system may not automatically generate the pipeline in response to detecting that the particular type of event occurred in relation to another project. In this way, the user may have more granular control over which types of events and projects prompt the system to automatically generate pipelines.

As one particular example, the system can receive three event notifications having the following content, respectively:

{"type":"patchset-create",change:{"project":"tools/gerrit", . . . }, . . . }
{"type":"patchset-update",change:{"project":"tools/gerrit", . . . }, . . . }
{"type":"comment-added",change:{"project":"tools/gerrit", . . . }, . . . }

These three event notifications can be indicative of three different types of events, namely a patchset-create event, a patchset-update event, and a comment-added event, respectively. A patchset-create event can involve a patch for a software project being created, a patchset-update event can involve a patch for a software project being updated, and a comment-added event can involve a comment on the software project being added. A user may have specified which of these event types should prompt the automatic generation of a pipeline. For example, the user may have customized the system to automatically generate pipelines in response to pachset-create events and patchset-update events, but not comment-added events. As a result, the system may automatically generate pipelines in response to the first event notification and the second event notification, but not the third event notification.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
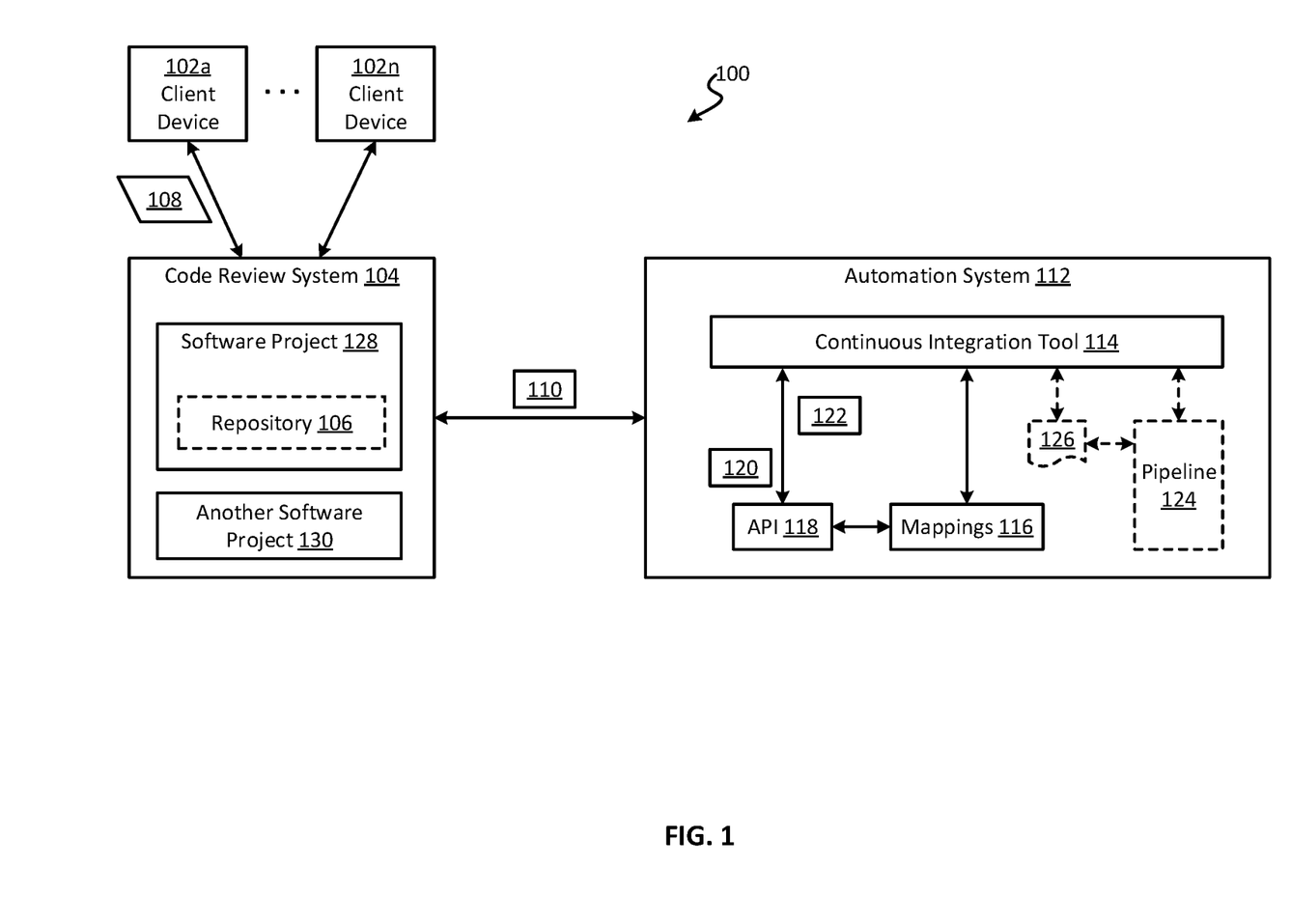
FIG. 1 is a block diagram of an example of a system for automatically generating continuous integration pipelines according to some aspects of the present disclosure.

FIG. 1 is a block diagram of an example of a system 100 for automatically generating continuous integration pipelines according to some aspects of the present disclosure. The system 100 includes client devices 102*a-n*, such as laptop computers, desktop computers, tablets, or smart phones. Users can operate the client devices 102*a-n* to interact with a code review system 104, which can allow the users to collaborate on developing source code for a software project (project) 128. For example, the users can operate the client devices 102*a-n* to download local copies of the source code from a repository 106 of the code review system 104, update their local copies of the source code, and then submit the updated source code over a network (e.g., a local area network or the Internet) to the code review system 104. The code review system 104 can receive the updated source code and store it in the repository 106 associated with the project 128.

In some examples, the code review system 104 can monitor aspects of the project 128 to detect events associated with the project 128. The monitoring system 102 can then generate event notifications based on the detected events. For example, the code review system 104 can detect the submission of source code 108 (e.g., updated source code) from client device 102*a*. This submission may constitute an event. The code review system 104 can then generate an event notification 110 based on detecting such an event. The event notification 110 can include information about the corresponding event, such as a time, date, type, and identifier of the event. After generating the event notification 110, the code review system 104 can transmit the event notification 110 over a network to an automation system 112.

The automation system 112 can assist in implementing a continuous integration process. For example, the automation system 112 can include a continuous integration tool 114 for executing continuous integration pipelines in response to the event notifications. Examples of the continuous integration tool 114 can include Jenkins, Buildbot, and Travis CI.

In some examples, the continuous integration tool 114 can receive an event notification 110 from the code review system 104 and responsively determine if the event notification 110 has a corresponding preexisting pipeline. The continuous integration tool can determine if the event notification 110 has a corresponding preexisting pipeline using any number and combination of techniques. As one example, the continuous integration tool 114 can access predefined mappings 116 indicating relationships between events and preexisting pipelines. Such mappings 116 may be preconfigured by a user, such as a DevOps engineer, of the automation system 112. The continuous integration tool 114 can access the predefined mappings 116 to determine if they indicate a relationship between a preexisting pipeline and the event associated with event notification 110. If so, the continuous integration tool 114 can determine that there is a preexisting pipeline associated with (e.g., assigned to) the event. If not, then continuous integration tool 114 can determine that there is not a preexisting pipeline associated with the event. In another example, the continuous integration tool 114 can transmit a request 120 to an API 118 of the automation system 112. The request 120 can be for an identifier of a preexisting pipeline corresponding to the event, and may include information about the project 128 or event associated with the event notification 110. Based on the request 120, the automation system 112 can determine if a preexisting pipeline is associated with the event (e.g., by accessing predefined mappings 116). If so, the automation system 112 can return a response 122 to the continuous integration tool 114 indicating which preexisting pipeline is associated with the event. Otherwise, the automation system 112 can return a response 122 to the continuous integration tool 114 indicating that a preexisting pipeline is not associated with the event. The response 122 can be provided to the continuous integration tool 114 via the API 118.

If the continuous integration tool 114 determines that there is a preexisting pipeline associated with the event (that triggered the event notification 110), then the continuous integration tool 114 can apply the preexisting pipeline to the source code 108. For example, the continuous integration tool 114 can access a specification describing the characteristics of the preexisting pipeline, where such a specification may be stored in memory. Based on the specification, the continuous integration tool 114 can determine that the preexisting pipeline involves a testing phase in which a group of tests are to be applied to the source code 108 in a particular order to validate the source code 108. So, the continuous integration tool 114 can implement the testing phase of the preexisting pipeline by applying the group of tests in the particular order to the source code 108.

If the continuous integration tool 114 determines that there is not a preexisting pipeline associated with the event (that triggered the event notification 110), then the continuous integration tool 114 can automatically generate a pipeline 124. The continuous integration tool 114 can automatically generate the pipeline 124 based on information included in the event notification 110, such as the name, type, or identifier of the event. Generating a pipeline 124 can involve creating a specification 126 for the pipeline 124, where such a specification 126 defines the characteristics of the pipeline 124, and storing the specification 126 in memory. The continuous integration tool 114 can automatically determine the specification 126 using any number and combination of the following approaches, as well as other approaches.

In some examples, the continuous integration tool 114 can automatically determine one or more tests to include in the pipeline 124 by executing CircleCl or other similar software. Such software can analyze various aspects of a project 128, such as the source code for the project 128, to determine one or more tests to execute in relation to the project 128. Based on the results of such software, the continuous integration tool 114 may determine which tests to include in the pipeline 124 and an order for the tests. The continuous integration tool 114 can then incorporate such information into the specification 126.

Additionally or alternatively, the continuous integration tool 114 can determine aspects of the pipeline 124 based on characteristics of other preexisting pipelines. For example, the continuous integration tool 114 can determine that the project 128 is similar to another software project 130 for which a preexisting pipeline was executed. The continuous integration tool 114 can determine that the two projects are similar based on any number and combination of commonalities between the two projects, such as if the two projects use the same programming language, have the same setup files (e.g., make files), have similar project names, have one or more common tags, have a similar structure, or any combination of these. As one particular example, the continuous integration tool 114 can determine that at least one similarity exists between the two projects, such as that the two projects use the same programming language or have a descriptive tag in common with one another. Based on determining that the similarity exists between the two projects, the continuous integration tool 114 can determine a preexisting pipeline that was applied to the other software project 130, for example based on the predefined mappings 116. The continuous integration tool 114 can then determine one or more characteristics of the preexisting pipeline. Based on the one or more characteristics of the preexisting pipeline, the continuous integration tool 114 can automatically generate the pipeline 124. For example, the continuous integration tool 114 can determine that the pipeline 124 is to include a sequence of tests due to the preexisting pipeline including the sequence of tests. The continuous integration tool 114 can then incorporate such information into the specification 126.

Additionally or alternatively, the continuous integration tool 114 can determine aspects of the pipeline 124 based on a predefined pipeline template, which may serve as a starting point for the specification 126. A pipeline template can define a general specification for a pipeline, with one or more "blanks" to be filled in based on the characteristics of the event notification, the corresponding project, or both. For example, the pipeline template may be a text file with a structure configured to be compatible with (e.g., ingestible and understandable by) the continuous integration tool 114. That structure may include boilerplate language, such as certain heading or commented information, and a certain format of sections and subsections that is compatible with the continuous integration tool 114. And at least some of the content of those sections and subsections may be left blank, to be later filled in by the continuous integration tool 114 in response to receiving the event notification 110. The filled-in pipeline template may serve as at least part of the specification 126 for the pipeline 124.

Additionally or alternatively, the continuous integration tool 114 can manage (e.g., execute, configure, or delete) the pipeline 124 based on one or more user customizations. The automation system 112 may receive the user customizations as input via a client device, such as client devices 102a-n. Examples of such user customizations can include one or more tests to include in the pipeline 124, an order for the tests, a name for the pipeline 124, a type of the pipeline 124 (e.g., multi-job), a format or location for an output of the pipeline 124, a build tool to use in the pipeline 124, or any combination of these. Such user customizations may also include a retention time for the pipeline 124; a retention time for outputs of the pipelines 124, such as log files and reports generated by the pipeline 124; or both. A retention time is a timeframe in which to maintain an item on the automation system 112, where the item is automatically removed from the automation system 112 upon the expiration of the timeframe. Various other user customizations are also possible. For example, a user may select a particular project or group of projects for which to automatically generate pipelines, such that pipelines are not automatically generated for unselected projects or groups of projects. The continuous integration tool 114 can manage the pipeline 124 based on the user customizations, for example by generating portions of the specification 126 based on the user customizations.

After generating the pipeline 124, the continuous integration tool 114 can apply the pipeline 124 to the source code 108. Applying the pipeline 124 to the source code 108 can involve executing the sequence of phases defined in the specification 126 for the pipeline 124 on the source code 108, such as by building the source code 108 into artifacts and executing one or more tests on the artifacts. This can allow the continuous integration tool 114 to validate or test the source code 108.

After the pipeline 124 has completed, the continuous integration tool 114 can delete the pipeline 124. Deleting the pipeline 124 can involve removing the specification 126 for the pipeline 124 from memory. The continuous integration tool 114 can immediately delete the pipeline 124 upon its completion, or the continuous integration tool 114 can delete the pipeline 124 upon the expiration of a predefined retention time (e.g., a week). For example, the continuous integration tool 114 can determine that the pipeline 124 completed, wait for a predefined timespan corresponding to the retention time, and delete the pipeline 124 once the predefined timespan has elapsed. Either way, the pipeline 124 can be relatively transitory and have a relatively short lifecycle, as compared to other pipelines of the automation system 112.

Although FIG. 1 depicts a certain number and arrangement of components, it will be appreciated that other examples can involve more components, fewer components, different components, or a different arrangement of the components shown in FIG. 1. For instance, in other examples the project 128 or repository 106 can be monitored using other types of monitoring systems that are different from a code review system 104, but still capable of detecting events and transmitting event notifications in response to detecting such events. Additionally or alternatively, the predefined mappings 116 may be internal to the continuous integration tool 114 and may be established through user interaction with a graphical user interface of the continuous integration tool 114. Additionally or alternatively, the automation system 112 and the code review system 104 may be integrated with one another, such that they are part of the same system rather than separate systems. It will also be appreciated that while various functionality is described herein in relation to the continuous integration tool 114, in other examples any software or combination of software (shown or not shown in FIG. 1) may implement such functionality, additionally or alternatively to the continuous integration tool 114.

Figure 2:
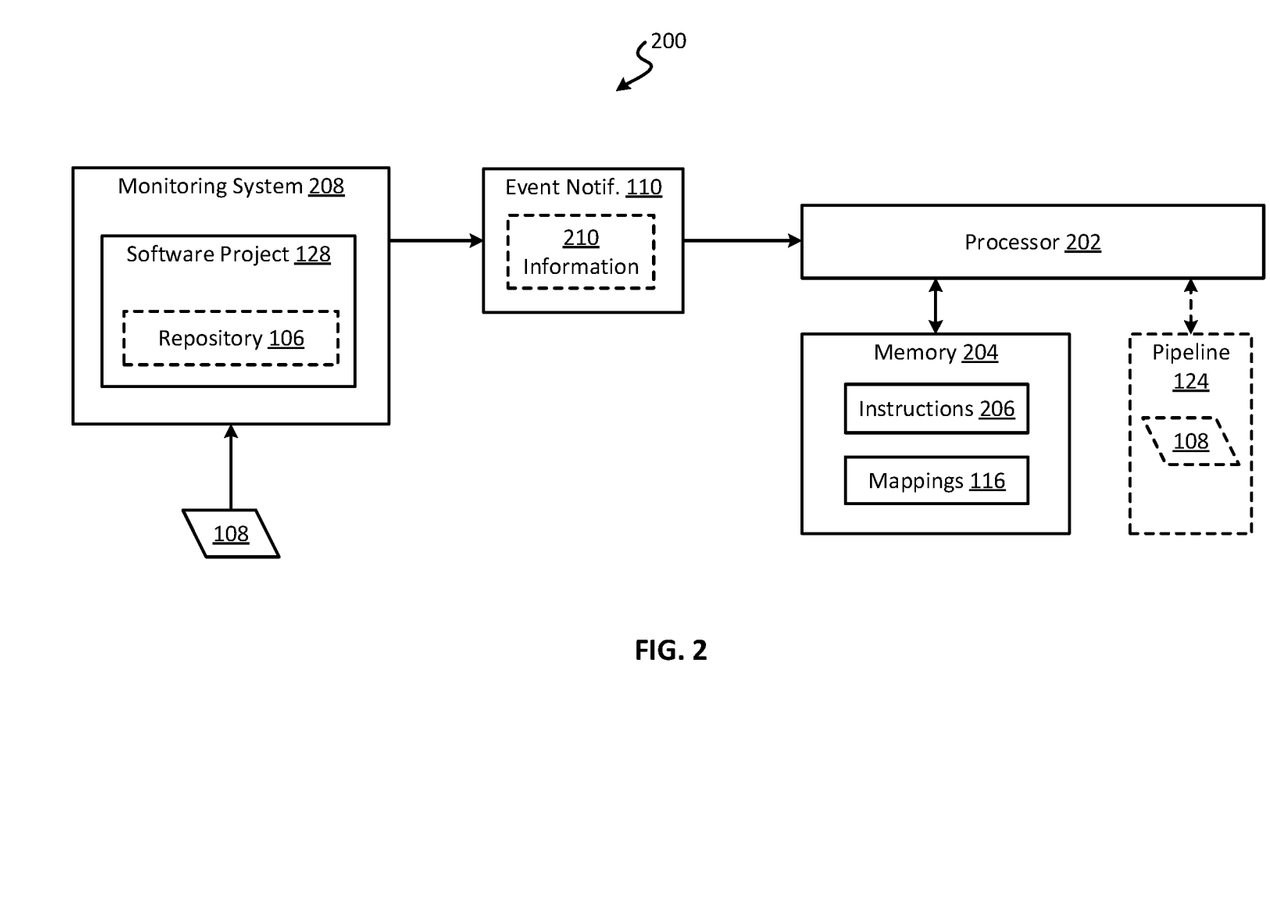
FIG. 2 is a block diagram of another example of a system for automatically generating continuous integration pipelines according to some aspects.

FIG. 2 is a block diagram of another example of a system 200 for automatically generating continuous integration pipelines according to some aspects. The system 200 includes a processor 202 communicatively coupled to a memory 204. The processor 202 and the memory 204 may be located in a common housing of a computing device (e.g., a server) or distributed from one another. In some examples, the processor 202 and memory 204 form part of the automation system 112 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium. A non-transitory computer-readable medium can include electronic, optical, magnetic, or other storage devices capable of providing the processor 202 with the instructions 206 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 206.

In some examples, the processor 202 can receive an event notification 110 indicating an event involving source code 108 for a software project 128 being submitted (e.g., committed) to a repository 106. The source code 108 may be submitted to the repository 106 by a developer of the software project 128. The processor 202 can receive the event notification 110 from a monitoring system 208, such as a code review system, or from another source.

The processor 202 can determine that the event does not have a corresponding continuous-integration pipeline based on predefined mappings 116. The processor 202 can make such a determination before or after receiving the event notification 110. The predefined mappings 116 may indicate relationships between events and continuous integration pipelines (e.g., preexisting continuous-integration pipelines). The processor 202 can analyze the predefined mappings 116 to determine if the event does, or does not, have a corresponding continuous-integration pipeline.

The processor 202 can generate a continuous integration pipeline 124 to be applied to the source code 108. The processor can automatically generate the continuous integration pipeline 124 in response to receiving the event notification 110, in response to determining that the event does not have the corresponding continuous-integration pipeline, or both of these. The processor 202 can generate the continuous integration pipeline 124 based on information 210 included in the event notification 110. Such information 210 can include, for example, a time, date, type, and identifier of the event.

After generating the continuous integration pipeline 124, the processor 202 can apply the continuous integration pipeline 124 to the source code 108, for example to test or validate the source code 108. The processor 202 can then delete the continuous integration pipeline 124. That is, the processor 202 can delete the continuous integration pipeline 124 subsequent to applying the continuous integration pipeline 124 to the source code 108.

Figure 3:
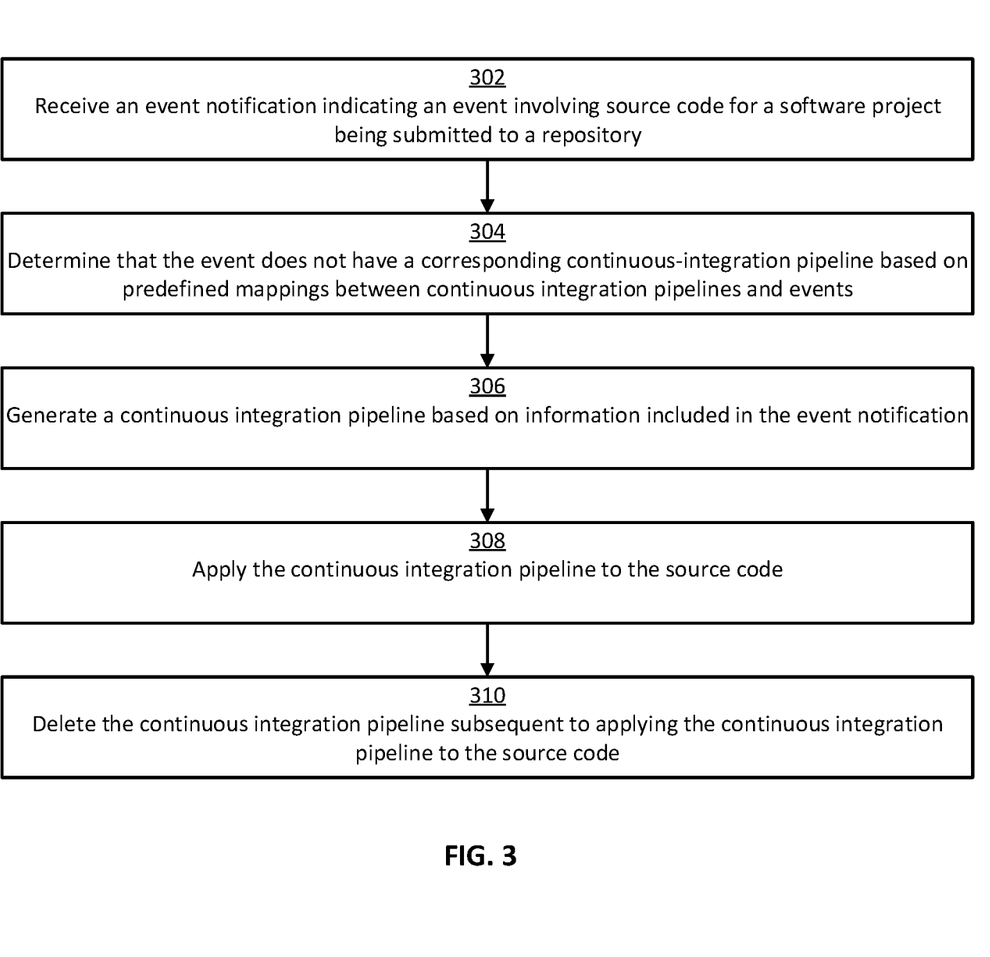
FIG. 3 a flow chart of an example of a process for automatically generating continuous integration pipelines according to some aspects of the present disclosure.

In some examples, the processor 202 can implement some or all of the operations shown in FIG. 3. Other examples can involve more operations, fewer operations, different operations, or a different order of the operations than is depicted in FIG. 3. The operations of FIG. 3 are described below with reference to components of FIG. 2.

In block 302, the processor 202 receives an event notification 110. The event notification 110 can indicate an event involving source code 108 for a software project 128 being submitted to a repository 106. Alternatively, the event notification 110 can indicate another type of event associated with the software project 128. The processor 202 can receive the event notification 110 from any suitable source, such as a monitoring system 208.

In block 304, the processor 202 determines that the event does not have a corresponding continuous-integration pipeline based on predefined mappings 116 between events and continuous integration pipelines. The processor 202 can access the predefined mappings 116 to determine whether or not the event has a corresponding continuous-integration pipeline specified in the mappings 116.

In block 306, the processor 202 generates a continuous integration pipeline 124 based on information 210 included in the event notification 110. Generating the continuous integration pipeline 124 can involve creating a specification defining the continuous integration pipeline 124 and storing the specification in memory, such as memory 204. The processor can automatically generate the continuous integration pipeline 124 in response to receiving the event notification 110, in response to determining that the event does not have the corresponding continuous-integration pipeline, or both of these.

In block 308, the processor 202 applies the continuous integration pipeline 124 to the source code 108. For example, the processor 202 can execute the continuous integration pipeline 124 in relation to the source code 108 to test or validate the source code 108. The continuous integration pipeline 124 can generate outputs, such as logs or reports, indicating which tests succeeded and failed during the testing phase of the continuous integration pipeline 124.

Such outputs may assist developers of the software project 128 in debugging the source code 108.

In block 310, the processor 202 deletes the continuous integration pipeline 124. Deleting the continuous integration pipeline 124 can involve deleting a specification defining the continuous integration pipeline 124 from memory, such as memory 204. The processor 202 can immediately delete the pipeline 124 upon its completion, or the processor 202 can delete the pipeline 124 upon the expiration of a predefined retention time.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, aspects of the present disclosure can be combined together or reordered to yield still further examples.

The invention claimed is:

1. A system comprising:
   a processor; and
   a memory including instructions that are executable by the processor for causing the processor to:
   receive an event notification indicating an event involving source code for a software project being submitted to a repository;
   in response to receiving the event notification, access predefined mappings stored in a memory device, wherein the predefined mappings specify correlations between a plurality of existing continuous-integration pipelines and a plurality of different events that trigger usage of the existing continuous-integration pipelines;
   determine that the event does not have a corresponding continuous-integration pipeline in the predefined mappings; and
   in response to (i) receiving the event notification and (ii) determining that the event does not have the corresponding continuous-integration pipeline:
   generate a continuous integration pipeline based on information included in the event notification;
   apply the continuous integration pipeline to the source code; and
   delete the continuous integration pipeline subsequent to applying the continuous integration pipeline to the source code.

2. The system of claim 1, wherein the event notification is received from a monitoring system that is configured to monitor one or more aspects of the software project and detect the event.

3. The system of claim 1, wherein the instructions form part of a continuous integration tool.

4. The system of claim 1, wherein the memory further includes instructions that are executable by the processor for causing the processor to:
   receive a user customization associated with the continuous integration pipeline prior to receiving the event notification; and
   manage the continuous integration pipeline based on the user customization.

5. The system of claim 1, wherein the memory further includes instructions that are executable by the processor for causing the processor to generate the continuous integration pipeline by automatically creating a specification for the continuous integration pipeline and storing the specification in the memory, wherein the specification is absent from the memory prior to receiving the event notification.

6. The system of claim 5, wherein the memory further includes instructions that are executable by the processor for causing the processor to create the specification based on a predefined pipeline template, the specification being separate from the predefined pipeline template.

7. The system of claim 5, wherein the memory further includes instructions that are executable by the processor for causing the processor to:
   analyze the source code to determine a characteristic of the source code;
   determine one or more tests to include in the continuous integration pipeline based on the characteristic of the source code; and
   create the specification based on the one or more tests.

8. The system of claim 5, wherein the software project is a first software project, and wherein the memory further includes instructions that are executable by the processor for causing the processor to:
   determine a similarity between the first software project and a second software project;
   based on determining the similarity, determine an existing continuous-integration pipeline corresponding to the second software project;
   determine a characteristic of the existing continuous-integration pipeline; and
   create the specification based on the characteristic of the existing continuous-integration pipeline.

9. The system of claim 8, wherein the similarity includes a programming language, a descriptive tag, a file, a name, or a structure that is common among the first software project and the second software project.

10. The system of claim 5, wherein the memory further includes instructions that are executable by the processor for causing the processor to delete the continuous integration pipeline by removing the specification from the memory.

11. The system of claim 1, wherein the memory further includes instructions that are executable by the processor for causing the processor to:
   determine a completion time for the continuous integration pipeline, the completion time being a time at which the continuous integration pipeline finished being applied to the source code;
   wait for a predefined timespan subsequent to the completion time, the predefined timespan being a retention time that is user customizable;
   determine that the predefined timespan has elapsed; and
   delete the continuous integration pipeline based on determining that the predefined timespan has elapsed.

12. The system of claim 1, wherein the event is a particular type of event among a plurality of event types, and the continuous integration pipeline is configured to be used only in response to detecting the particular type of event.

13. The system of claim 1, wherein the plurality of different events includes a plurality of different types of events.

14. The system of claim 1, wherein the memory further includes instructions that are executable by the processor for causing the processor to:
   determine that the continuous integration pipeline finished being applied to the source code; and
   in response to determining that the continuous integration pipeline finished being applied to the source code, delete the continuous integration pipeline.

15. A method comprising:
receiving, by a processor, an event notification indicating an event involving source code for a software project being submitted to a repository;
in response to receiving the event notification, accessing, by the processor, predefined mappings stored in a memory device, wherein the predefined mappings specify correlations between a plurality of existing continuous-integration pipelines and a plurality of different events that trigger usage of the existing continuous-integration pipelines;
determining, by the processor, that the event does not have a corresponding continuous-integration pipeline in the predefined mappings; and
in response to (i) receiving the event notification and (ii) determining that the event does not have the corresponding continuous-integration pipeline:
generating, by the processor, a continuous integration pipeline based on information included in the event notification;
applying, by the processor, the continuous integration pipeline to the source code; and
deleting, by the processor, the continuous integration pipeline subsequent to applying the continuous integration pipeline to the source code.

16. The method of claim 15, wherein the event notification is received from a monitoring system that is configured to monitor one or more aspects of the software project and detect the event.

17. The method of claim 15, further comprising:
prior to receiving the event notification, receiving a user customization specifying that the continuous integration pipeline is to be automatically generated in relation to the event; and
based on the user customization, automatically generating the continuous integration pipeline in response to receiving the event notification.

18. The method of claim 15, further comprising generating the continuous integration pipeline by automatically creating a specification for the continuous integration pipeline and storing the specification in memory, wherein the specification is absent from the memory prior to receiving the event notification.

19. The method of claim 18, wherein the software project is a first software project, and further comprising:
determining a similarity between the first software project and a second software project;
based on determining the similarity, determining an existing continuous-integration pipeline corresponding to the second software project;
determining a characteristic of the existing continuous-integration pipeline; and
creating the specification based on the characteristic of the existing continuous-integration pipeline.

20. A non-transitory computer-readable medium comprising program code that is executable by a processor for causing the processor to:
receive an event notification indicating an event involving source code for a software project being submitted to a repository;
in response to receiving the event notification, access predefined mappings stored in a memory device, wherein the predefined mappings specify correlations between a plurality of existing continuous-integration pipelines and a plurality of different events that trigger usage of the existing continuous-integration pipelines;
determine that the event does not have a corresponding continuous-integration pipeline in the predefined mappings; and
in response to (i) receiving the event notification and (ii) determining that the event does not have the corresponding continuous-integration pipeline:
generate a continuous integration pipeline based on information included in the event notification;
apply the continuous integration pipeline to the source code; and
delete the continuous integration pipeline subsequent to applying the continuous integration pipeline to the source code.

* * * * *